United States Patent [19]
Dinh et al.

[11] Patent Number: 5,452,581
[45] Date of Patent: Sep. 26, 1995

[54] OLEFIN RECOVERY METHOD

[76] Inventors: Cong X. Dinh, 214 Huggins Ferry, Sugar Land, Tex. 77479; William C. Petterson, 2307 Fall Meadow, Missouri City, Tex. 77459; Ashutosh Rastogi, 130 Asian Games Village, New Delhi, Ind., 110049; Vijender K. Verma, 2424 Long Reach Dr., Sugar Land, Tex. 77478

[21] Appl. No.: 222,205

[22] Filed: Apr. 1, 1994

[51] Int. Cl.$^6$ .................................................. F25J 3/02
[52] U.S. Cl. ........................................... 62/24; 62/28
[58] Field of Search ................................ 62/23, 24, 28

[56] References Cited

U.S. PATENT DOCUMENTS

| | | | |
|---|---|---|---|
| 3,864,418 | 2/1975 | Hughes et al. | 260/677 |
| 4,548,619 | 10/1985 | Steacy | 62/23 |
| 4,654,047 | 3/1987 | Hopkins et al. | 62/23 |
| 4,743,282 | 5/1982 | Mehra | 62/17 |
| 4,832,718 | 5/1989 | Mehra | 62/17 |
| 5,019,143 | 5/1991 | Mehra | 62/17 |
| 5,082,481 | 1/1992 | Barchas et al. | 62/23 |
| 5,220,097 | 6/1993 | Lam et al. | 585/809 |

OTHER PUBLICATIONS

Weber et al., *Chemical Engineering Process*, pp. 23–28, Nov., 1986.
Davis, "Facilitated Transport Membrane Hybrid Systems for Olefin Publication," BP Research/Catalyst Consultants Inc. of Pennsylvania, Nov., 1991.

Lam et al., "Advanced Ethylene Process," A.I.Ch.E. Spring National Meeting, Mar. 31, 1993, Houston, Texas.

MEDAL Separation System, Manufacturer's Literature, Jul. 1991.

*Primary Examiner*—Ronald C. Capossela
*Attorney, Agent, or Firm*—The M. W. Kellogg Company

[57] ABSTRACT

A method is described for recovering olefins by condensation from the reaction effluent stream from a cracking furnace containing olefins and hydrogen wherein a membrane separator is employed to reject the hydrogen from the reaction effluent stream. In such a manner, the dew point temperature of the stream can be increased and the energy required to provide refrigeration for olefin condensation can be reduced. The method comprises primary condensation, vapor-liquid separation and membrane hydrogen rejection steps followed by a series of cascaded chilling and vapor-liquid separation steps. Condensate recovered is processed in a demethanizer to separate light end components. Also disclosed is an olefins plant employing a membrane separator for rejecting hydrogen to enhance the energy efficiency and/or facilitate the expansion of plant capacity.

28 Claims, 3 Drawing Sheets

OLEFIN RECOVERY METHOD

FIELD OF THE INVENTION

The present invention relates to olefins recovery in an olefins plant wherein hydrogen is rejected using a membrane.

BACKGROUND OF THE INVENTION

Ethylene is a ubiquitous building block in the manufacture of a wide variety of chemical and plastic products. Ethylene is typically produced industrially by pyrolysis of hydrocarbons in a furnace in the presence of steam. The furnace effluent stream comprising a range of components is typically cleaned up, dried to remove water, compressed and passed to an olefins recovery section to condense the ethylene and other condensable heavy end components (ethane, propylene, propane, etc.). The condensed stream is then distilled to remove the light ends (methane and hydrogen) and fractionated to separate ethylene from the heavy ends.

Compositional range of the furnace effluent stream depends on several factors including the type of hydrocarbon feedstock used. A representative composition of the effluent of a furnace employing three different hydrocarbon feedstocks and operated to maximize ethylene formation is given in Table 1.

TABLE 1

| | Effluent Composition (mole %) Furnace Feedstock | | |
|---|---|---|---|
| Component | Ethane | Propane | Naphtha |
| $H_2$ | 35.9 | 20.5 | 15.8 |
| $CH_4$ | 6.5 | 27.8 | 26.5 |
| $C_2H_4$ | 34.3 | 32.0 | 33.6 |
| $C_2H_6+$ | 23.3 | 19.7 | 24.1 |

As can be seen, hydrogen is a substantial portion of the effluent. Hydrogen has an undesirable impact on the stream dew point temperature. Greater refrigeration power is required to condense out ethylene and other components from streams containing a high hydrogen concentration, and refrigeration makes up a significant portion of the process energy requirements. Additionally, in existing plants ethylene refrigeration availability may be limited and therefore a process bottleneck to any increase in ethylene output. U.S. Pat. No. 5,082,481 to Barchas et al. describes the use of a membrane separator to remove approximately 20 percent of the hydrogen from a cracked gas effluent containing olefins after compression but before any refrigeration of the effluent stream to separate out low-boiling components, usually before drying and removal of heavy hydrocarbons from the effluent stream well upstream from the low temperature separation system.

Membrane based unit separation systems are an advancing art. Recent developments include long lasting, high flux membrane structures. Membranes are used in gas and liquid purifying systems such as desalination, blood dialysis, recovery of precious materials from waste streams, concentrating heat sensitive biotechnical substances, and the like. Other applications proposed include industrial gas separation, processing aqueous waste streams for pollution control and processing food and beverage streams. Weber et al., *Chemical Engineering Progress*, November 1986, pp. 23–28 gives an overview of membrane separation systems finding application in the petrochemical and other industries including the recovery and recycle of hydrogen from purge streams in ammonia and methanol manufacture, and separation of carbon dioxide from natural gas, etc.

A least two types of membranes are commercially available, hollow fiber type membranes and spiral wound type membranes. The hollow fiber membrane is said to consist of millions of thin, hollow polymer fibers. Gases with high permeation rates diffuse through the membrane, flow out through the hollow fiber interior and are channeled into a permeate stream. Gases with a low permeation rate flow around the walls of the fibers. The driving force for the separation is the difference in partial pressure between the object gas in the feed stream and that of the permeate stream. The spiral wound membranes are similar but are made by winding the polymer on a perforate tube to form the membrane.

Davis, "Facilitated Transport Membrane Hybrid Systems for Olefin Purification," published by BP Research of Ohio in conjunction with Catalyst Consultants Inc. of Pennsylvania, November 1991, describes the use of a reverse osmosis membrane in a hybrid membrane-distillation process for separating propylene from propane. The membrane system is said to have a high flux, high selectivity and long life for operation at high transmembrane pressure.

U.S. Pat. No. 3,864,418 to Hughes et al. describes the preparation of hydrophilic, semi-permeable film membranes having a relatively large quantity of pores and containing complex-forming material dissolved in a solvent said to be useful for separating olefinically unsaturated hydrocarbons from mixtures.

As far as applicant is aware, in an ethylene plant employing hydrocarbon pyrolysis, it has been heretofore unknown to use a membrane device to reject at least a portion of the hydrogen byproduct from a reactor effluent stream after refrigeration with a low level refrigerant to partially condense out olefins from the effluent stream, but prior to final olefins recovery in the chilling train with a high level refrigerant, for the purposes of enhancing the hydrogen rejection rate (due to a higher partial pressure of hydrogen following partial olefin condensation), raising the effluent stream dew point temperature, lowering refrigeration energy usage and shifting cooling requirements from ethylene refrigeration to propylene refrigeration.

SUMMARY OF THE INVENTION

A membrane-based hydrogen separation apparatus employed in a chilling train of an ethylene plant can raise the dew point temperature of condensing streams and shift refrigeration requirements from relatively colder ethylene refrigeration to relatively warmer propylene refrigeration to reduce energy usage. The membrane separator can be installed in an existing plant revamp to reduce the load on the cold (high level) refrigeration compressor and associated exchangers without undue disruption of the production schedule or process re-design. In addition, installation of an intercondenser on an olefins recovery train demethanizer can significantly extend energy savings achieved using membrane separation.

In one embodiment, the present invention provides a method for recovering olefins from any stream of hydrocarbons containing hydrogen and olefins, preferably a hydrocarbon cracking furnace effluent stream. In one step, the effluent stream is refrigerated to partially condense olefins therefrom and form a vapor stream of enhanced hydrogen content. In another step, hydrogen is selectively rejected from the vapor stream using a membrane separator to form a hydrogen-lean stream. As additional steps, olefins from the hydrogen-lean stream are condensed and recovered through a series of chilling and vapor-liquid separation steps. The condensed olefins are further treated in a methane separator, e.g. a demethanizer, to separate light ends.

In a preferred embodiment, prior to the hydrogen rejection step, olefins and heavier components in the furnace effluent stream are partially condensed, preferably against propylene refrigerant at a temperature below about 0° C., and especially between about −30° C. and −50° C., and recovered in a primary chilling and vapor-liquid separation step to form a lean vapor stream. If needed, the lean vapor stream is heated to a temperature suitable for the membrane separator. After hydrogen rejection in the membrane separator, the residual gas has a higher dew point, allowing more condensation against a relatively warmer refrigerant such as propylene, and reducing the portion of the gas stream which needs to be condensed at lower temperatures against a colder refrigerant such as ethylene.

The methane separator can comprise a demethanizer distillation column. The olefins separation step preferably includes cooling the demethanizer column using an intermediate condenser. The intermediate condenser is preferably operated at or above a lowermost feed point.

The present method can include, if desired, the step of reinjecting liquids condensed from the furnace effluent stream into the hydrogen-lean stream from the membrane separator prior to the further steps of condensing and separating olefins from the hydrogen-lean stream. The condensed olefins can be stripped of methane and lighter components for feed to the demethanizer distillation step.

In another embodiment, the present invention provides an olefins plant comprising a furnace for cracking hydrocarbons and producing an effluent stream comprising hydrogen and olefins. The plant has a compressor train, preferably including a drier and optionally a chiller in series therewith, for conditioning the furnace effluent stream. The plant also has a primary condenser supplied with low level refrigerant to partially condense olefins out of the conditioned effluent stream and form a vapor stream of enhanced hydrogen composition. The plant includes a membrane hydrogen separator for rejecting hydrogen from the vapor stream and producing a hydrogen lean stream. A series of cascaded condensers and vapor liquid separators are adapted to condense and recover olefins from the hydrogen-lean stream and produce a cooled olefin-lean vapor stream. The plant also includes a methane separator such as a distillation column demethanizer for recovering a methane stream from the condensed olefins, and a refrigeration system for supplying refrigerant to one or more of the cascaded condensers.

The olefins plant can use a deethanizer-first or a depropanizer-first scheme, that is, the plant can include a distillation unit for substantially separating $C_3$ or $C_4$, respectively, and heavier components from the conditioned furnace effluent before feeding to the membrane separator.

Using a demethanizer-first scheme, the primary condenser is preferably operatively associated with a primary vapor-liquid separator for partially condensing olefins from the conditioned furnace effluent to produce a primary lean vapor stream for feed to the cascaded condensers and separators. If necessary, a heater can be provided for heating the primary lean vapor stream to a temperature suitable for the membrane separator.

The olefins plant preferably includes a series of cascaded cross exchangers for partially condensing olefins from a portion of the furnace effluent stream by heat exchange against the cooled olefins-lean vapor and recovered methane streams. Preferably, an expander is provided to expand and further cool the olefins-lean vapor and recovered methane streams, and lines are provided for directing the cooled olefins-lean vapor and recovered methane streams as heat exchange media to the cross exchangers.

The demethanizer in the olefins plant preferably has an intermediate condenser. The demethanizer intercondenser is preferably operable adjacent a feed point receiving feed having the highest bubble point temperature, i.e. the lowermost feed point.

Hydrocarbons substantially comprising ethane are preferably cracked in the furnace, and the olefins substantially comprise ethylene. The membrane separator is preferably operated substantially in an ethylene-loss-minimization mode, and in particular, the ethylene loss in the membrane separator is preferably less than about 2 weight percent, especially less than 1 weight percent, and from about 10 to about 90 weight percent of the hydrogen is preferably rejected in the membrane separator, especially 30 to 80 weight percent.

As another embodiment, the present invention provides a method for revamping an existing ethylene plant, wherein the plant comprises a hydrocarbon cracking furnace, a chilling train composed of a series of first and successive cascaded condensers and vapor-liquid separators for olefins condensation and recovery, and a demethanizer. The method comprises the steps of: (a) installing a membrane hydrogen separator downstream from at least the first condenser and vapor-liquid separator to receive the vapor stream from and reject hydrogen therefrom to form a hydrogen lean stream for feed to one or more of the successive condensers and separators; (b) optionally installing a heater to heat feed to the membrane apparatus; (c) optionally installing a line to reinject liquid from the first vapor-liquid separator into the hydrogen-lean vapor stream from the membrane separator; and (d) optionally installing an intercondenser on the demethanizer adjacent a lowermost feed point.

A further embodiment provides an improvement to a method for recovering olefins from a cracking furnace effluent stream containing olefins, wherein the method includes the steps of condensing and recovering olefins from the furnace effluent stream through a series of chilling and vapor-liquid separation steps, including partially condensing olefins and heavier components from the furnace effluent stream in a primary chiller and recovering condensed olefins and lean vapor in a primary vapor-liquid separator and condensing and recovering olefins from the lean vapor stream through a series of secondary chilling and vapor-liquid separation steps, and distilling the recovered olefins in a demethanizer. The improvement comprises the step of selectively rejecting hydrogen from the lean vapor stream using a membrane separator. The olefin distilling step preferably includes operating an intermediate condenser adjacent a feed point in the demethanizer receiving feed having the highest bubble point temperature.

DETAILED DESCRIPTION OF THE INVENTION

Figure 1:
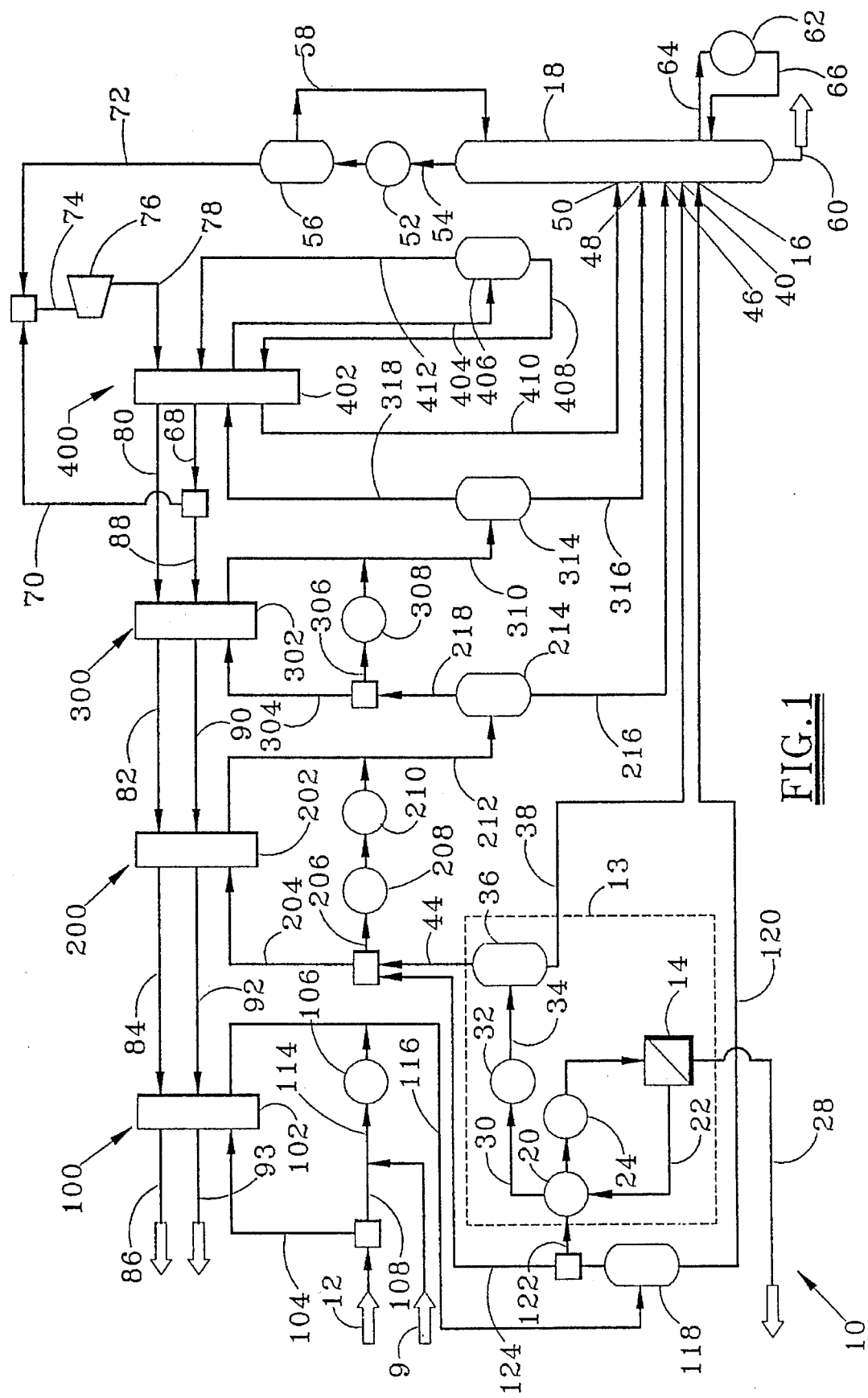
FIG. 1 is a schematic diagram of a chilling train of an ethylene plant of the present invention showing a membrane hydrogen separation module installed following a first olefins condensate separation drum and an intermediate condenser installed on the demethanizer above a lowermost feed point.

A membrane separator is used to reject hydrogen from a cracking furnace effluent stream to raise the stream dew point temperature and reduce the use of low temperature chilling, e. g. ethylene refrigeration, to condense olefins, such as in a chilling train or distillation column. In such a manner, energy consumption in the chilling process can be substantially lowered. Further, it has been discovered that energy savings realized through membrane hydrogen rejection can be extended by employing an intermediate condenser on a conventional demethanizer typically used to remove light ends from the condensed olefins.

As known in the petrochemical arts, olefins such as ethylene, propylene, butadiene and the like are conventionally produced from a hydrocarbon feedstock by pyrolysis, generally in reaction tubes of a cracking furnace (not shown) in the presence of steam. Suitable feedstocks include ethane, propane, butane, naphthas, gas oil and other petroleum fractions. The present olefins recovery process is particularly effective for use in an ethylene plant wherein ethane is cracked.

The furnace effluent stream composition and yield are dependent on several factors including feedstock type, steam content, conversion rate, and furnace temperature, pressure, residence time, severity, etc. The furnace effluent stream generally contains hydrogen, steam and a range of hydrocarbon products including ethylene, propylene and other olefins. The raw effluent is cooled generally by one or more quenches (not shown) with, for example, water wherein process heat can be recovered for other uses. The raw quenched effluent can be optionally distilled in a primary fractionation zone (not shown) to separate heavy fractions and to knock out steam condensate. Following any primary fractionation and/or cooling quenching steps, the vapors are compressed in a multi-stage compression zone (not shown) to a pressure suitable for subsequent cryogenic olefins recovery—typically to a final pressure of from about 2.0 to about 4.6 MPa. (As used herein, all pressures are denoted as absolute pressure unless gauge pressure is indicated.) Prior to or after the final compression stage, the compressed stream can be treated in an acid gas removal zone (not shown) for the removal of $H_2S$ and $CO_2$, if necessary. The acid gas removal zone generally comprises conventional scrubbers using agents such as caustic and/or amines. Following compression and acid gas removal, the gas is generally dried to remove residual water in a drier (not shown) using a desiccant such as a molecular sieve, for example, to prevent the formation of ice or hydrates during subsequent cooling.

The preconditioned furnace effluent is typically separated into its various components in a methane separation unit, a deethanizer, an ethane-ethylene separator (also called a $C_2$ splitter), a depropanizer, etc. In the present invention, a partial condenser and a membrane separator are used, respectively to condense out the easily condensed olefins to increase the partial pressure of hydrogen in the vapor stream from the condenser, and to reject hydrogen upstream from the methane separation unit to reduce the amount of hydrogen processed during subsequent condensation operations. This can have the benefit of reducing the amount of low-temperature refrigeration (e.g. ethylene refrigeration) required, lowering vapor and liquid traffic in the separation unit, and lowering the size and/or energy requirements. The methane separation unit is preferably a demethanizer column or a solvent absorption/regeneration unit, but can be any separation equipment capable of separating methane and lighter components from ethylene and heavier components. Solvent-based absorption/regeneration methane separation units are well known and are described, for example, in Lam et al., "Advanced Ethylene Process," A.I.Ch.E. Spring National Meeting, Mar. 31, 1993, Houston, Tex.; and U.S. Pat. Nos. 4,743,282; 4,832,718; 5,019,143; and 5,220,097; all of which are incorporated herein by reference.

Briefly, the solvent-based system employs a depropanizer which separates the $C_4$ and heavier components from the conditioned furnace effluent to form an overhead stream comprising $C_3$ and lighter components. The overhead stream from the depropanizer is fed to an absorber and contacted with a solvent to obtain a primary methane and hydrogen overhead stream and an enriched solvent bottom stream. The enriched solvent is fed to a reboiled regenerator wherein $C_2$'s and $C_3$'s are recovered overhead. The methane/hydrogen absorber stream overhead can, if desired, be processed in a small demethanizer column, and the regenerator overhead stream is processed in a deethanizer and/or ethylene and/or propylene splitter to recover ethane, ethylene, propane and propylene as desired. In a preferred embodiment, the depropanizer overheads are compressed, cooled and condensate prestripped in a column, feeding non-condensed vapor to the solvent absorber/regenerator and condensate from the prestripper column directly to the deethanizer, as described in commonly assigned U.S. Ser. No. 221,616, "Hybrid Condensation-Absorption Olefin Recovery Process," filed of even date herewith by Verma et al., which is hereby incorporated herein by reference.

In the demethanizer-first scheme, a large condensation temperature differential between the condensable components (olefins plus heavy ends) and the non-condensable components (methane plus other light ends) in the reaction product stream, requires olefins to be separated by using a cascaded series of condensation stages. In the cascaded stages, the gas fed to each stage is chilled to progressively lower temperatures to knock out condensable components. The condensate is then separated from the vapor in a respective knock-out drum and the remaining gas is sent on for further treatment, e.g. further condensation, refrigeration recovery and/or hydrogen recovery. Condensate recovered at each stage is fed to a demethanizer to separate residual light ends components (methane and hydrogen). A demethanizer bottoms olefins product is directed to an olefins refining section (not shown) for further fractionation to separate individual olefin and heavy end products, for example, in a deethanizer, depropanizer, ethane-ethylene splitter, or the like.

In one embodiment of the present process, four cascaded cooling stages are used. Cooling in the condensation stages is generally (but not necessarily) divided between a process cross exchanger for an exchange of heat against one or more cold process streams and a refrigeration condenser for an exchange of heat against a refrigerant. The proportion of the split between the cross exchanger and the refrigeration condenser will depend on the amount of cooling available from the cold process stream(s), but the process cross exchanger generally receives a minor portion of the incoming gas.

Referring to the drawings, wherein like referenced parts have like numerals, the gaseous furnace effluent stream following clean-up and compression having a representative composition as given in Table 1 (for an ethane feedstock) is directed through line 12 to a chilling train 10 particularly suitable for a new plant design as best seen in FIG. 1. The present chilling train 10 comprises a membrane separation zone 13 having a membrane separator 14, for rejecting a substantial portion of the hydrogen contained in the dried and compressed furnace effluent.

Incoming gas is introduced through line 12 to a first condensation stage 100 wherein liquid propylene and/or recycle ethylene is employed as the primary refrigerant. A portion of the gas is directed to a cross exchanger 102 through line 104 and the remaining portion is directed to a first condenser 106 for partially condensing condensable olefins components therefrom. If desired, the gas fed through line 108 mixes prior to the condenser 106 with a drier liquid stream 9, preferably supplied as condensate obtained from the compressor in the furnace effluent conditioning equipment (not shown), as described in commonly assigned U.S. Ser. No. 221,908, "Enhanced Olefin Recovery Method," filed of even date herewith by Verma et al., which is hereby incorporated herein by reference. The mixed stream is then directed to the condenser 106 through line 114. The cooled streams from the condenser 106 and cross exchanger 102 are recombined and directed through line 116 to a first vapor-liquid separator drum 118.

As seen in FIG. 1, condensate from the bottom of the drum 118 is fed through line 120 to a relatively lower feed point 16 on a demethanizer 18. Vapor from the drum 118 is directed to the membrane separation zone 13 through line 122. An optional bypass line 124 from the drum 118 enables the membrane separation zone 13 to be bypassed, e.g. in the event of maintenance, without having to take the plant off line.

The first condensation stage 100 generally operates at a pressure of the compression zone (about 2.0 to about 4.6 MPa) and at a temperature below about 20° C., preferably below about 0° C., more preferably between −30° C. and −50° C.

In the membrane separation zone 13, hydrogen is substantially separated from the conditioned vapor using a membrane to produce a hydrogen-lean stream. The hydrogen-lean stream having a much higher dew point temperature is then further chilled to condense olefins and recover condensable components. Prior to the membrane separator 14, if necessary, the vapor from drum 118 is generally heated to suitable membrane operating conditions. Vapor in line 122 is preferably heated initially in a cross exchanger 20 by an exchange of heat first against a hydrogen-lean impermeate stream 22 and then in a heater 24 by an exchange of heat against a suitable heating medium such as, for example, steam.

The membrane separator 14 can comprise any membrane system which is substantially permeable for hydrogen and substantially impermeable for ethylene and heavier hydrocarbons. Membrane systems suitable for use in the practice of the present invention further are characterized by having good compatibility with the process stream, a strong structural strength to endure high transmembrane pressure differential, an adequate flux for given separation parameters, and the like. Membrane systems having these characteristics are known and available commercially from various manufacturers and under various tradenames, such as, for example, UOP, Hydranautics, Toray, Toyobo, DuPont, Permasep, Aschi, Eltech Systems, Occidental Chemicals, Oxytech Systems, Monsanto, Medal, Dow Chemical, W.R. Grace, Separex, Delta Engineering, Ube and the like. A hydrogen-rich permeate stream is obtained via line 28. Gas which does not permeate the membrane separator exits through line 22.

Figure 3:
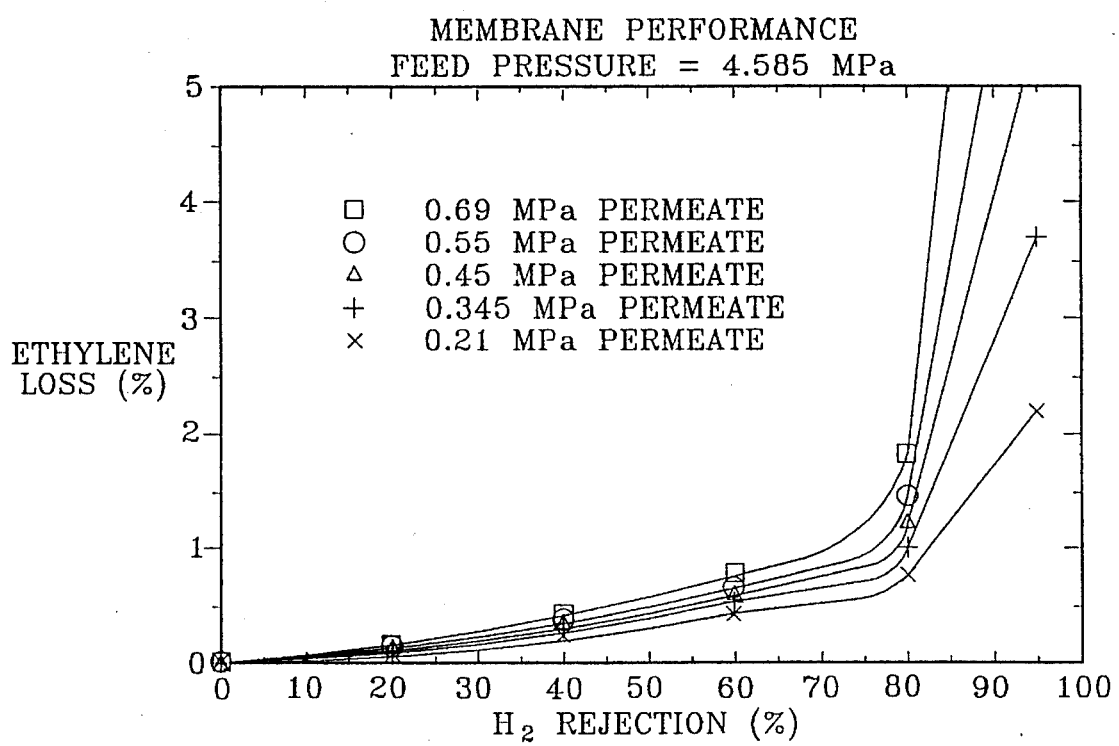
FIG. 3 is a graph showing isobaric performance curves at 0.2–0.7 MPa (30–100 psia) absolute permeate pressure, for a typical membrane system installed following the first −37° C. condensate separation drum in a process of the present invention, plotting ethylene loss as a function of hydrogen recovery.
Figure 4:
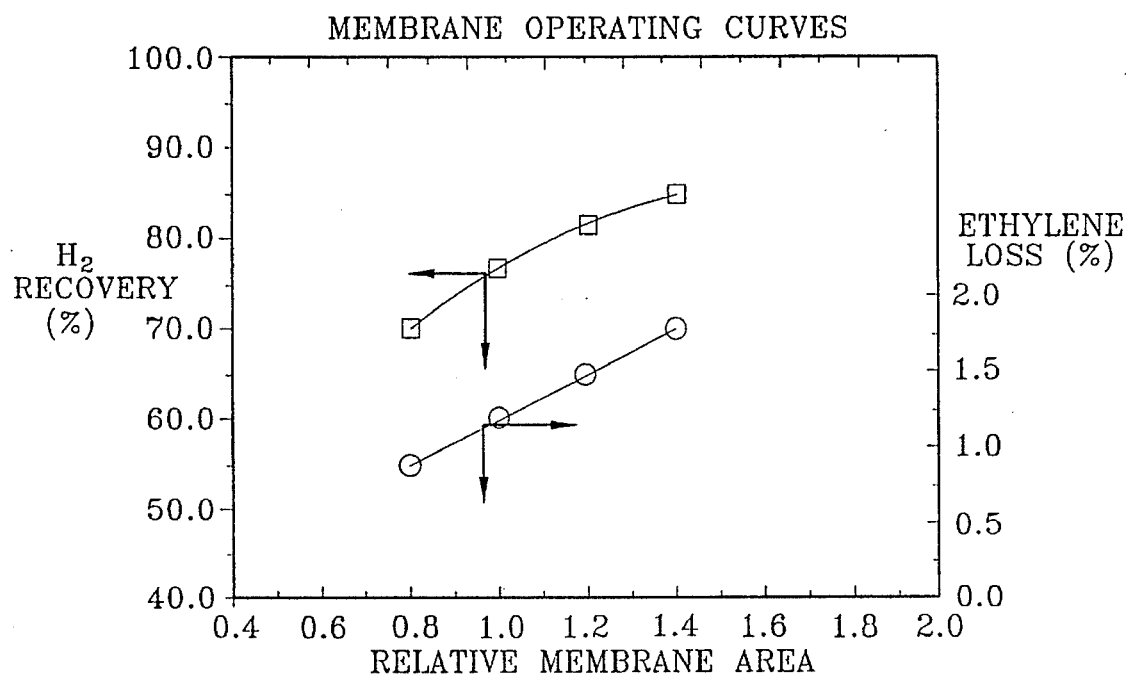
FIG. 4 is a graph showing isobaric operating curves at 0.5 MPa absolute permeate pressure for a typical membrane system, installed following the first −37° C. condensate separation drum in a process of the present invention, plotting hydrogen recovery and ethylene loss against the relative cross-sectional membrane area.

Membrane permeability and selectivity are dependent on several variables including operating temperature, differential pressure and amount of surface area. Permeability is directly proportional and selectivity is inversely proportional to temperature and differential pressure. For a typical industrial polymer hollow fiber membrane system given a fixed inlet flowrate, stream composition and condition, a relationship between relative surface area needed and desired outlet composition is illustrated in FIG. 4. Under similar fixed parameters, a relationship between hydrogen rejection and ethylene loss for a given pressure drop is shown in FIG. 3. Higher operating temperatures increase flux (the hydrogen rejection rate), but also increase ethylene loss into the hydrogen permeate, other conditions being equal. Higher differential pressures for hydrogen rejection generally improve both flux and selectivity.

In the present invention, in contrast to other membrane hydrogen separation processes, hydrogen recovery is not a primary objective; rather, the avoidance of excessive product (ethylene) losses is more important. Consequently, a preferred operating mode is one which limits ethylene (or other olefin products) losses. This can avoid the need to separate ethylene and other hydrocarbons from the permeate (hydrogen), but the hydrogen recovery maximizing mode could be used where this consideration is not as important. In the membrane separator 14, ethylene losses in the hydrogen permeate stream 28 should preferably be low, preferably less than about 2 percent while rejecting from about 30 to about 90, more preferably from about 50 to about 80 percent of the hydrogen, from the reaction effluent stream in line 12.

The membrane separator 14 can be installed at other locations in the olefins recovery process of this invention, but a location following the first condensate separation drum 118 is preferred in the FIG. 3 process because partial pressure of hydrogen is higher and overall flow is lower since a large portion of $C_2$'s and heavier components have already been condensed and removed. In contrast, locating the membrane separator 14 immediately upstream from the drier (not shown) as in the prior art Barchas et al. reference significantly reduces the amount of hydrogen which can be rejected at low ethylene losses and thus seriously limits the potential energy savings.

The hydrogen-lean stream from the exchanger 20 is directed through line 30 to a second condenser 32 for further cooling and liquid condensation. The second condenser 32 also preferably cools against low level (−40° C.) propylene refrigerant and the resulting partially condensed stream preferably flows through line 34 into a second vapor-liquid separator drum 36. Condensate from the drum 36 generally has a lower bubble point temperature than condensate from the first drum 118, and is directed through line 38 to a lower intermediate feed point 40 of the demethanizer 18. Alternatively, but less efficiently, the drum 36 is not used and the effluent from condenser 32 is fed directly to a second condensation stage 200.

Vapor (and any condensate if the drum 36 is not used) is introduced through line 44 to the second condensation stage 200 wherein ethylene refrigerant is used. Similar to the first stage 100, the vapor is divided with a portion directed to a second cross exchanger cooler 202 through line 204 with the remaining portion passed though line 206 to condensers 208 and 210. The partially condensed split streams thus cooled are recombined and passed through line 212 to a third vapor-liquid separator drum 214. Separated condensate from the third drum 214 is directed through line 216 to the demethanizer 18 at an intermediate feed point 46.

The condenser 208 typically operates at a temperature on the order of −60° C. corresponding to the ethylene refrigerant at about −63° C. The condenser 210 typically operates at a temperature on the order of −83° C. corresponding to the ethylene refrigerant at about −86° C. The pressure of the second condensation stage 200 is preferably similar to the pressure of the membrane separator (2.0 to 4.5 MPa).

Vapor from the third drum 214 is introduced through line 218 to a third condensation stage 300 wherein ethylene is again the primary refrigerant. Similar to the first and second stages 100, 200, the vapor is divided with a portion directed to a third cross exchanger 302 through line 304 with the remaining portion passed though line 306 to condenser 308. The condenser 308 preferably operates at a temperature on the order of −97° C. corresponding to ethylene refrigerant at about −100° C. The pressure of the third condensation stage 300 is also preferably similar to the pressure of the membrane separator.

The split streams thus cooled and partially condensed are recombined and passed through line 310 to a fourth vapor-liquid separator drum 314. Condensate separated from the fourth drum 314 is directed through line 316 to the demethanizer 18 at a relatively higher intermediate feed point 48.

Vapor from the fourth drum 314 is introduced through line 318 to a fourth and final condensation stage 400 wherein the primary refrigerant is preferably one or more cold process gas streams. From the drum 314, the vapor is preferably directed in full to the cross exchanger 402 wherein most of the $C_2$ and heavier remaining condensable components are condensed by an exchange of heat with chilled process gas streams, e.g. light ends which are not condensed in the olefins recovery process. A partially condensed chilled stream 404 from the exchanger 402 is passed to a fifth vapor-liquid separator drum 406. Condensate separated in the fifth drum 406 is generally fed via line 408 to the demethanizer 18 at a relatively higher feed point 50. However, the fifth condensate stream 408 is first preferably passed through the cross exchanger 402 as a cooling liquid. The partially heated fifth condensate stream 410 is then fed to the demethanizer 18.

The demethanizer 18 as known in the art can be a distillation column containing conventional internal vapor/liquid contacting devices such as, for example, packing shapes or trays. Overall dimensions and number of trays are specified by standard design criteria which in turn depend on composition of the several condensate feeds. Overhead vapor from the demethanizer 18 is passed through line 54 to the condenser 52 wherein refrigerant is used to condense condensable components. A partially condensed demethanizer overhead is passed to a condensate knock-out drum 56. Condensate recovered from the overhead stream is recycled as reflux liquid to the demethanizer 18 through line 58. Cold overhead vapor components comprising light ends (mostly methane) separated from the olefin and heavy component liquids are directed to the cross exchange coolers 402, 302, 202 and/or 102 as a cooling medium for recapture of a portion of the cooling energy. Note that any pressure selected for the operation of the demethanizer 18, and various other methods of providing reflux can be used in the present invention.

The bulk of the demethanizer vaporization heat for vapor reflux is provided by a reboiler (not shown). The demethanizer reboiler can use a conventional low temperature heating medium such as propylene refrigerant, condensing vapor or the like.

Bottoms liquid comprising olefins and heavy ends from the demethanizer 18 is directed through line 60 for fractionation into individual components in a conventional refining zone (not shown) typically comprising a deethanizer, $C_2$ splitter, depropanizer, etc.

In the practice of the present invention, an intermediate demethanizer condenser 62 is optionally used as shown in FIG. 1 to enhance overall energy efficiency of the cryogenic distillation and extend energy savings realized by use of the membrane separator 14. It has been found that use of the intermediate condenser adjacent the lowermost feed point can improve the energy efficiency of the distillation column by shifting condensation cooling duty from the overhead condenser 52 to the intermediate condenser 62 operating at a higher temperature. Thus, a lower quality refrigerant can be used as the cooling medium for the intermediate condenser 62, reducing the cooling duty on the overhead condenser 52 which requires colder refrigerant. A side stream from the demethanizer 18 at a tray adjacent the feed point 16 is withdrawn through line 64 and cooled in the intercondenser 62 by an exchange of heat with a suitable cooling medium such as, for example, propylene refrigerant. The cooled stream is returned to the column 18 through line 66.

Cold noncondensable vapor from the fifth drum 406 may be further processed to improve hydrogen purity, for example, in one or more cascaded cooling zones (not shown). With or without such additional processing, the vapor is preferably used in a cascaded fashion as cooling media in the cross exchangers 102, 202, 302, 402. The vapor from the fifth drum 406 is passed through line 412 as a cooling medium in the cross exchanger 402 and then through lines 68 and 88 as a cooling medium in the cross exchanger 302. However, a portion or all of the stream 68 can be diverted through line 70 and combined with the cold light ends gas stream in line 72, comprising primarily methane with some hydrogen and carbon monoxide, from the demethanizer 18. The combined stream 74 can be further cooled by expansion in an expander 76 to increase cooling capacity of the stream. The proportion of the stream 68 diverted into line 70 generally depends on the chilling process cooling balance in accordance with standard engineering concepts.

The expanded, cooled stream from the expander 76 is directed through line 78 to cross exchanger 402 as an additional cooling medium, and then through line 80 to exchanger 302, through line 82 to exchanger 202 and through line 84 to exchanger 102. A methane-rich fuel gas stream is recovered in line 86. The remaining hydrogen from line 68 is passed through line 88 preferably to the cross exchanger 302 as a cooling medium, through line 90 to the cross exchanger 202 and then through line 92 to the cross exchanger 102 to provide a hydrogen-rich product in line 93.

Figure 2:
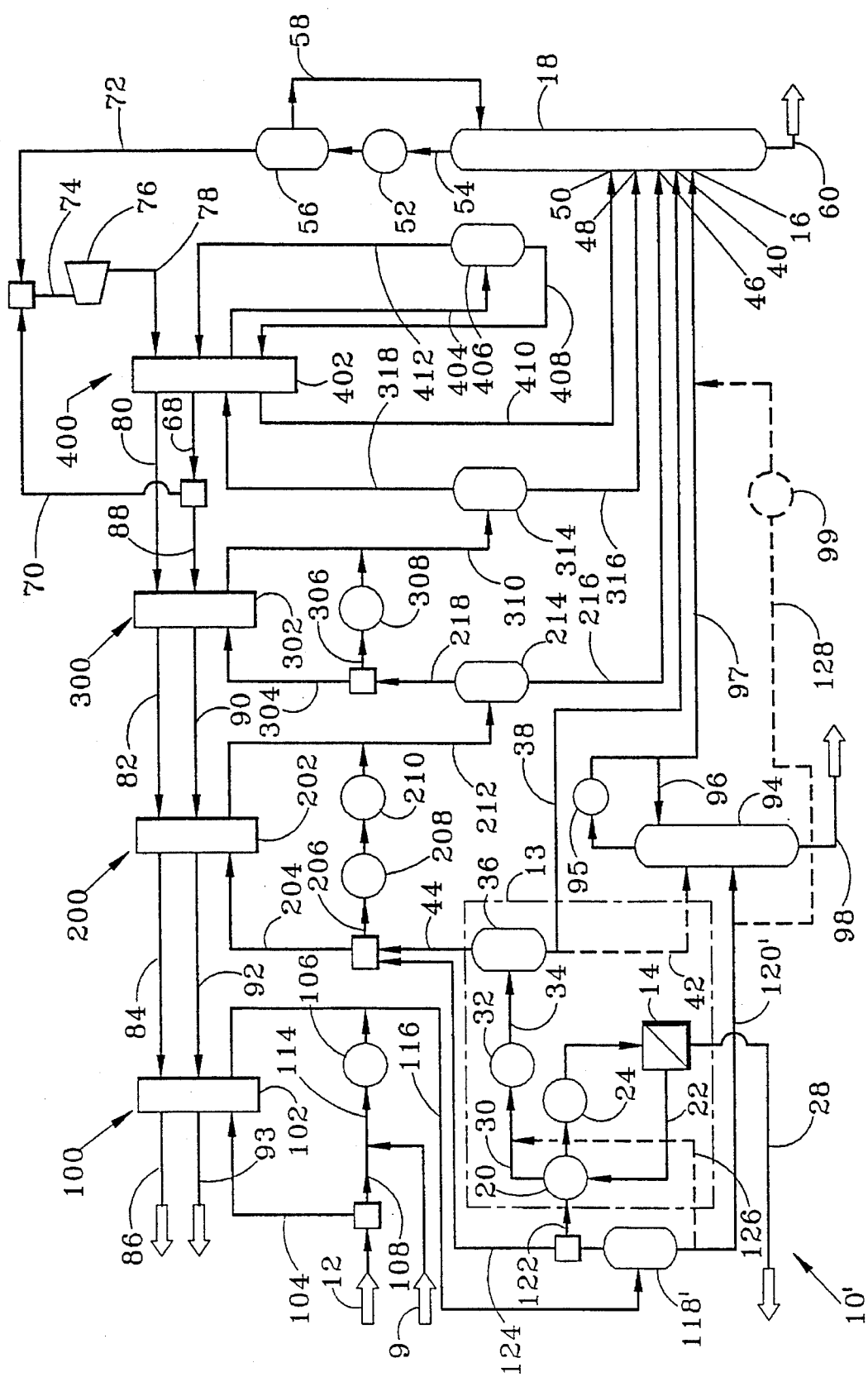
FIG. 2 is a schematic diagram of a chilling train of an ethylene plant revamp of the present invention showing a membrane hydrogen separation module installed following a first olefins condensate separation drum, optional liquid reinjection from the first condensate separation drum, and use of an optional stripper and/or subcooler on a feed line to the demethanizer.

Referring to FIG. 2, a revamp plant embodiment 10' comprises the membrane separator 14 installed in the chilling train of an existing ethylene plant. In such a manner, the old plant can be revamped for energy savings according to the principles of the present invention. In the revamp plant embodiment 10', the overall degree of energy savings (in comparison to the new plant embodiment in FIG. 1) can be affected by the degree of optimization undertaken with the installation of the membrane separator 14 since an existing plant can include or omit various process steps which affect the economics of the membrane separator installation. For example, a plant revamped by installing membrane hydrogen rejection may not result in a significant reduction in overall energy usage, but there can still be a major reduction in ethylene refrigeration duties (e.g. in condensers 208, 210 and 308 and cross exchangers 102, 202, 302 and 402) which might allow the plant capacity to be increased without substantial modification or expansion of the ethylene refrigeration system or chilling train stages 100, 200, 300 and 400.

In the revamp plant embodiment 10', a first stage condensate stream 120' can optionally be fed from a drum 118' to the demethanizer 18 via a demethanizer feed prestripper column 94. Alternatively, the liquid from the drum 118' can optionally be reinjected through line 126 into the hydrogen-lean stream 30 prior to the second condenser 32. Condensate from the second separator drum 36 can either be directed through line 38 to the feed tray 40 on the demethanizer 18 or first stripped of heavy components. In the latter case, the condensate from the second drum 36 can be fed though line 42 to the prestripper 94 prior to the demethanizer 18. An overhead condenser 95 preferably using propylene refrigerant may be employed to provide liquid reflux to the prestripper 94 through line 96. An overhead olefins stream leaving the prestripper 94 is fed through line 97 to the demethanizer 18. A bottoms stream comprising the $C_2+$ heavy components is withdrawn from the stripper 94 through line 98.

The prestripper 94 can contain conventional vapor/liquid contacting devices such as, for example, packing shapes or trays. Where the revamp allows modification of the prestripper 94, overall column design and operating parameters including dimensions and number of stages can be specified by standard engineering design principles depending on the feed composition and flowrate.

In an alternative arrangement in place of the prestripper 94, the condensate feed to the demethanizer 18 from the first condensate separation drum 118' can be directed through line 128 to a subcooler 99, preferably using propylene refrigerant. As another option (not shown), the condensate feed to the demethanizer 18 from the second condensate separation drum 36 can be subcooled.

It is noted that chilling train embodiments 10, 10' of the present invention employ a demethanizer-first process. The present invention, however, can also be used for a depropanizer-first process wherein an initial distillation cut is made between $C_3$ and $C_4$ components prior to light ends separation, or in a deethanizer-first process wherein an initial distillation cut is made between $C_2$ and $C_3$ components. In connection with the deethanizer- or depropanizer-first arrangement, the membrane separator 14 should most preferably be installed after the first condensate separation drum 118 (or 118') at which point heaviest components are substantially removed from the reaction effluent stream and the fraction of hydrogen is relatively higher due also to substantial condensation and separation of such heavier components upstream from the drum 118. In the deethanizer- or depropanizer-first processes, the membrane separator zone 13 can be installed after the first tower, at which point potentially contaminating components of the reaction effluent stream are substantially removed, preferably after the chilling train condenser which uses the lowest level of propylene refrigerant to maximize propylene refrigerant duty and minimize ethylene refrigerant requirements in the chilling train stages downstream from the membrane separation zone 13.

The present invention can be further described by reference to the following examples.

Examples 1–3 and Comparative Examples A–C

Computer simulations were undertaken on the olefins recovery section (including the demethanizer) of an olefin plant using ethane, propane and naphtha as feedstocks to determine comparative advantage from use of membrane separators to reject hydrogen in conjunction with olefins condensation. Standardized ethylene process flow diagrams based on a demethanizer-first scheme conforming to FIGS. 1 and 2 were used. Yields for the feedstocks involved were based on actual plant results. Standard simulation methods were employed.

Simulation parameters include a 680 million kg/yr (1.5 billion lb/yr) production rate and a tolerable ethylene loss rate in the hydrogen rejected from the membrane. Pressure of the inlet stream 12 following the compression zone is 4.2 MPa (600 psia). Approximate composition of the inlet stream for the three feedstocks is given above in Table 1. For an ethane feedstock, composition of the membrane inlet stream is given in Table 2.

TABLE 2

| Component | Conc. (mole %) |
|---|---|
| $H_2$ | 52.97 |
| CO | 0.06 |
| $C_1$ | 8.04 |
| $C_2$ | 38.72 |
| $C_3$ | 0.17 |
| $C_4+$ | 0.04 |

A typical commercially available, hollow-fiber membrane was assumed. The membrane is installed following the first condensate separation drum (drum 118 or 118' in FIGS. 1–2). A minimum reject hydrogen pressure was set at 0.45 MPa (65 psia) so that the rejected hydrogen could be supplied to an existing fuel header without compression.

TABLE 3

| Feed-stock | Relative No. of Modules | Relative Membrane Cost | Ethylene loss (%) | Hydrogen Purity | Hydrogen Recovery (%) |
|---|---|---|---|---|---|
| Ethane | 80 | 80 | 0.88 | 98.9 | 69.3 |
|  | 100*b | 100 | 1.16 | 98.7 | 76.6 |
|  | 120 | 120 | 1.45 | 98.5 | 91.3 |
|  | 140 | 140 | 1.75 | 98.2 | 84.5 |
| Propane | 80 | 80 | 0.73 | 97.2 | 51.3 |
|  | 100* | 100 | 0.93 | 96.8 | 57.9 |
|  | 120 | 120 | 1.13 | 96.5 | 63.0 |
| Naphtha | 80 | 80 | 0.94 | 96.3 | 56.0 |
|  | 100* | 100 | 1.19 | 95.8 | 62.0 |
|  | 120 | 120 | 1.45 | 95.3 | 66.4 |

*—selected case for simulation.
b—base case

An optimal relative number of modules (relative membrane area) needed to minimize capital costs and ethylene losses versus hydrogen rejection and associated energy savings for each feedstock case was estimated for use in the simulation.

The simulation studied the effect of the membrane separator and liquids reinjection on the amount of liquids condensed against propylene in the first condensation stage for the three feedstocks. Results are given in Table 4.

TABLE 4

| Case | Liquids dropout, drum 118 (kg/hr) | Liquids dropout drum 36 (kg/hr) | Increase in liquids dropout over base case (kg/hr) |
|---|---|---|---|
| Ethane Feedstock | | | |
| Without membrane separator (base case) | 82,570 | — | — |
| With membrane separator | 87,020 | 45,120 | 49,570 |
| With membrane separator and drum 118 reinjection | 87,020 | 136,580 | 54,010 |
| Propane Feedstock | | | |
| Without membrane separator (base case) | 127,820 | — | — |
| With membrane separator | 131,090 | 5320 | 8590 |
| With membrane separator and drum 118 reinjection | 131,090 | 152,200 | 24,380 |
| Naphtha Feedstock | | | |
| Without membrane separator (base case) | 156,220 | — | — |
| With membrane separator | 159,390 | 2170 | 5340 |
| With membrane separator and drum 118 reinjection | 159,390 | 177,200 | 20,980 |

Simulation results in terms of unit refrigeration (or heat) duties were also developed for the different case variables. The simulation results are presented in Tables 5 A–C. Refrigeration duties are converted to brake horsepower (BHP) as a common unit of comparison while taking into account both the increase in the discharge pressure of the process gas compressor (PGC), due to pressure drop across the membrane and the reduced loading on the expander due to hydrogen removal.

TABLE 5A

| Process Unit (Refrigeration level and type) | Comp. Ex. A (Ethane base case with inter-condenser) | | Example 1 (Ethane with inter-condenser and membrane) | |
|---|---|---|---|---|
|  | Kw | BHP | Kw | BHP |
| Condenser 106 (−37° C., PR)[a] | 5606 | 4402 | 6874 | 5398 |
| Condenser 32 (−37° C., PR)[a] | 0 | 0 | 2408 | 1891 |
| Condenser 208 (−60° C., ER)[b] | 4435 | 6389 | 1467 | 2114 |
| Condenser 210 (−83° C., ER)[c] | 3395 | 5934 | 1049 | 1833 |
| Condenser 308 (−100° C., ER)[d] | 767 | 1611 | 152 | 320 |
| Cross Exchanger 402 (−100° C., ER)[d] | (231) | (486) | 0 | 0 |
| Stripper Reboiler (9° C.)[e] | 0 | 0 | 0 | 0 |
| Stripper Condenser 82, (−37° C., PR)[a] | 0 | 0 | 0 | 0 |
| Demethanizer Inter-condenser 62, (−37° C., PR)[a] | 146 | 115 | 1318 | 1035 |
| Demethanizer Condenser 52 (−100° C., ER)[d] | 741 | 1556 | 964 | 2023 |
| Demethanizer Reboiler, (9° C.)[e] | (9010) | (2461) | (8641) | (2358) |
| Expander 76 | — | (1355) | — | (233) |
| PGC (+0.2 MPa discharge pressure) | — | 0 | — | 570 |
| Subtotal PR | — | 2058 | — | 5968 |
| Subtotal ER | — | 15,005 | — | 6290 |
| Total | — | 15,706 | — | 12,595 |
| Savings | — | — | — | 3111 |

[a]—Power conversion rate for −37 C. propylene refrigeration is 0.7853 BHP/kw.
[b]—Power conversion rate for −60 C. ethylene refrigeration is 1.4409 BHP/kw.
[c]—Power conversion rate for −83 C. ethylene refrigeration is 1.7482 BHP/kw.
[d]—Power conversion rate for −100 C. ethylene refrigeration is 2.0999 BHP/kw.
[e]—Power conversion rate for 9 C. reboiler heating is 0.2732 BHP/kw.
PGC = Process gas compressor
PR = Propylene refrigeration
ER = Ethylene refrigeration

TABLE 5B

| Process Unit (Refrigeration level and type) | Comp. Ex. B (Propane base case with stripper) | | Example 2 (Propane with stripper and membrane) | |
|---|---|---|---|---|
|  | Kw | BHP | Kw | BHP |
| Condenser 106 (−37° C., PR)[a] | 7727 | 6067 | 8236 | 6468 |
| Condenser 32 (−37° C., PR)[a] | 0 | 0 | 1529 | 1201 |
| Condenser 208 (−60° C., ER)[b] | 2346 | 3380 | 1614 | 2325 |
| Condenser 210 (−83° C., ER)[c] | 2993 | 5233 | 2044 | 3574 |
| Condenser 308 (−100° C., ER)[d] | 823 | 1728 | 366 | 769 |
| Cross Exchanger 402 (−100° C., ER)[d] | 0 | 0 | 0 | 0 |
| Stripper Reboiler (9° C.)[e] | 0 | 0 | (7712) | 0 |
| Stripper Condenser 82, (−37° C., PR)[a] | 0 | 0 | 0 | 0 |
| Demethanizer Inter- | 0 | 0 | 0 | 0 |

TABLE 5B-continued

| Process Unit (Refrigeration level and type) | Comp. Ex. B (Propane base case with stripper) Kw | Comp. Ex. B (Propane base case with stripper) BHP | Example 2 (Propane with stripper and membrane) Kw | Example 2 (Propane with stripper and membrane) BHP |
|---|---|---|---|---|
| condenser 62, (−37° C., PR)[a] | | | | |
| Demethanizer Condenser 52 (−100° C., ER)[d] | 1254 | 2632 | 1189 | 2497 |
| Demethanizer Reboiler, (9° C.)[e] | (5498) | (1502) | (3808) | (1040) |
| Expander 76 | — | (1548) | — | (938) |
| PGC (+0.2 MPa discharge pressure) | — | 0 | — | 570 |
| Subtotal PR | — | 4566 | — | 6628 |
| Subtotal ER | — | 12,973 | — | 9165 |
| Total | — | 15,991 | — | 15,425 |
| Savings | — | — | — | 566 |

[a]—Power conversion rate for −37 C. propylene refrigeration is 0.7853 BHP/kw.
[b]—Power conversion rate for −60 C. ethylene refrigeration is 1.4409 BHP/kw.
[c]—Power conversion rate for −83 C. ethylene refrigeration is 1.7482 BHP/kw.
[d]—Power conversion rate for −100 C. ethylene refrigeration is 2.0999 BHP/kw.
[e]—Power conversion rate for 9 C. reboiler heating is 0.2732 BHP/kw.
PGC = Process gas compressor
PR = Propylene refrigeration
ER = Ethylene refrigeration

TABLE 5C

| Process Unit (Refrigeration level and type) | Comp. Ex. C (Naphtha base case with stripper) Kw | Comp. Ex. C (Naphtha base case with stripper) BHP | Example 3 (Naphtha with stripper/ membrane and reinjection) Kw | Example 3 (Naphtha with stripper/ membrane and reinjection) BHP |
|---|---|---|---|---|
| Condenser 106 (−37° C., PR)[a] | 8362 | 6567 | 8494 | 6783 |
| Condenser 32 (−37° C., PR)[a] | 0 | 0 | 1473 | 1157 |
| Condenser 208 (−60° C., ER)[b] | 1781 | 2566 | 1163 | 1675 |
| Condenser 210 (−83° C., ER)[c] | 2381 | 4163 | 1538 | 2688 |
| Condenser 308 (−100° C., ER)[d] | 600 | 1261 | 226 | 474 |
| Cross Exchanger 402 (−100° C., ER)[d] | 0 | 0 | (196) | (412) |
| Stripper Reboiler (9° C.)[e] | 0 | 0 | (9054) | 0 |
| Stripper Condenser 82, (−37° C., PR)[a] | 0 | 0 | 0 | 0 |
| Demethanizer Intercondenser 62, (−37° C., PR)[a] | 0 | 0 | 0 | 0 |
| Demethanizer Condenser 52 (−100° C., ER)[d] | 1198 | 2515 | 1614 | 3389 |
| Demethanizer Reboiler, (9° C.)[e] | (4391) | (1199) | (3175) | (867) |
| Expander 76 | — | (1301) | — | (855) |
| PGC (+0.2 MPa discharge pressure) | — | 0 | — | 570 |
| Subtotal PR | — | 5367 | — | 7072 |
| Subtotal ER | — | 10,504 | — | 7813 |
| Total | — | 14,571 | — | 14,601 |
| Savings | — | — | — | (30) |

[a]—Power conversion rate for −37° C. propylene refrigeration is 0.7853 BHP/kw.
[b]—Power conversion rate for −60° C. ethylene refrigeration is 1.4409 BHP/kw.
[c]—Power conversion rate for −83° C. ethylene refrigeration is 1.7482 BHP/kw.
[d]—Power conversion rate for −100° C. ethylene refrigeration is 2.0999 BHP/kw.
[e]—Power conversion rate for 9° C. reboiler heating is 0.2732 BHP/kw.
PGC = Process gas compressor
PR = Propylene refrigeration
ER = Ethylene refrigeration The simulation results in Table 5A demonstrate that for ethane feedstock and using a demethanizer intercondenser, the membrane separator saved about 3100 BHP in refrigeration power by significantly shifting refrigeration load from the ethylene system to the propylene system.

For the propane and naphtha feedstocks, as well as the ethane feedstock, a membrane system is shown to be effective in a plant revamp for unloading the ethylene refrigeration compressor by shifting the refrigeration duty to propylene refrigeration. In all examples, the ethylene refrigerant duties in condensers 208, 210 and 308 are considerably reduced when membranes are employed. Thus, the power required for ethylene refrigeration is significantly reduced. In addition, a net energy savings of 566 BHP can be obtained for the propane feedstock. Energy savings resulting from ethylene refrigeration reduction for propane and naphtha feedstocks is offset to some extent by an increase in process gas compression energy due to the membrane pressure drop and a reduction in the expander credit due to a reduced flowrate.

The present olefins recovery process is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

We claim:

1. A method for recovering olefins from an effluent stream from a cracking furnace containing olefins and hydrogen, comprising the steps of:
   partially condensing and recovering olefins from the furnace effluent stream to produce a primary olefin-lean vapor stream and a primary olefins condensate stream;
   optionally heating the primary vapor stream;
   selectively rejecting hydrogen from the primary lean vapor stream using a membrane separator to form a hydrogen-lean stream; and
   separating the hydrogen lean stream into olefin and volatile component streams.

2. The method of claim 1, wherein the separation step includes:
   condensing and recovering olefins from the hydrogen-lean stream through a series of chilling and vapor-liquid separation steps; and
   separating methane and hydrogen from the recovered olefins.

3. The method of claim 2, wherein the methane separation step includes cooling a demethanizer using an intermediate condenser substantially operated adjacent a lowermost feed point to the demethanizer.

4. The method of claim 3, further comprising the steps of stripping methane and lighter components from the primary olefins condensate stream, recovering an olefin stream from the stripping step essentially free of methane and hydrogen, and feeding the methane and lighter components from the stripping step to the demethanizer.

5. The method of claim 3, further comprising the step of subcooling the primary olefins condensate stream for feed to the demethanizer.

6. The method of claim 2, including the step of reinjecting the primary olefins condensate stream into the hydrogen-lean stream prior to the step of condensing olefins from the hydrogen-lean stream.

7. The method of claim 2, wherein the membrane separator is operated substantially in an ethylene-loss-minimization mode.

8. The method of claim 7, wherein the ethylene loss in the membrane separator is less than about 2.0 weight percent.

9. The method of claim 8, wherein from about 30 to about 80 weight percent of the hydrogen in the feed to the membrane separator is rejected.

10. A method for recovering olefins from a conditioned effluent stream from a cracking furnace said stream containing lighter and heavier components, comprising the steps of:

substantially separating the lighter components from the effluent stream in a depropanizer or deethanizer distillation column to provide a process stream containing said lighter components;

feeding at least a portion of the process stream from the depropanizer or deethanizer to a membrane separator for hydrogen rejection to form a hydrogen-lean stream;

feeding the hydrogen-lean stream to a solvent absorption/regeneration unit to form a volatiles stream essentially free of olefins and a first olefins stream essentially free of hydrogen and methane; and feeding the olefins stream from the solvent absorption/regeneration unit to a fractionation unit for purification into one or more olefin product streams.

11. The method of claim 10, comprising the steps of:

feeding the process stream from the depropanizer or deethanizer to a primary chiller and vapor-liquid separator to partially condense olefins and form a primary vapor stream and a primary condensate stream;

feeding the primary condensate stream to a prestripping column to form a secondary vapor stream and a second olefins stream essentially free of hydrogen and methane;

feeding at least the primary vapor stream and optionally the secondary vapor stream, to the membrane separator for said hydrogen rejection; and feeding the first and second olefin streams to the distillation column in said fractionation unit.

12. An olefins plant, comprising:

a furnace for cracking hydrocarbons and producing an effluent stream comprising hydrogen and olefins;

a compressor train for conditioning the furnace stream;

a primary condenser to partially condense olefins out of the conditioned effluent stream and form a primary vapor steam of enhanced hydrogen composition;

a membrane hydrogen separator for rejecting hydrogen from the primary vapor stream and producing a hydrogen-lean stream;

a series of cascaded condensers and vapor-liquid separators for condensing and recovering olefins from the hydrogen-lean stream, and producing a cooled olefin-lean vapor stream;

a methane separator for recovering a methane stream from the condensed olefins; and a refrigeration system for supplying refrigerant to the primary condenser and one or more of the cascaded condensers.

13. The olefins plant of claim 12, wherein the compressor train includes, in series, a drier optionally with a cooler, a chiller or a combination thereof.

14. The plant of claim 12, comprising a deethanizer distillation unit for substantially separating $C_3$ and heavier components from the conditioned furnace effluent before feeding the stream to the membrane separator.

15. The plant of claim 12, comprising a depropanizer distillation unit for substantially separating $C_4$ and heavier components from the conditioned furnace effluent before feeding the stream to the primary condenser.

16. The plant of claim 12, comprising a heater for heating the primary vapor stream to a temperature suitable for the membrane separator.

17. The plant of claim 12, wherein the methane separator comprises a demethanizer having an intermediate condenser operable adjacent a feed point receiving feed having the highest bubble point temperature.

18. The plant of claim 17, further including:

a series of cascaded cross exchangers for partially condensing olefins from a portion of the hydrogen-lean stream by heat exchange against the cooled olefins-lean vapor and recovered methane streams;

an expander for expanding and further cooling the olefins-lean vapor; and lines for directing the cooled olefins-lean vapor and recovered methane streams as heat exchange media to the cross exchangers.

19. The plant of claim 12, wherein the membrane separator is operable substantially in an ethylene-loss-minimization mode.

20. The plant of claim 19, wherein the ethylene loss in the membrane separator is less than about 2 weight percent and from about 30 to about 90 weight percent of the hydrogen is rejected in the membrane separator.

21. An olefin recovery plant, comprising:

a furnace for cracking hydrocarbons and producing an effluent stream comprising hydrogen and olefins;

an effluent conditioning unit including a compressor and a drier in series optionally with a cooler, a chiller or a combination thereof;

a distillation column selected from a depropanizer and a deethanizer for receiving the conditioned effluent stream from the conditioning unit and forming a liquid stream comprising heavier components essentially free of lighter components and a raw olefins stream essentially free of heavier components;

a membrane separator for rejecting hydrogen from at least a portion of the raw olefins stream to form a hydrogen stream and a hydrogen-lean stream;

a solvent absorption/regeneration unit for contacting the hydrogen-lean stream with solvent to form a vapor stream essentially free of olefins and thermally regenerating olefins-enriched solvent to recover a first olefins stream essentially free of methane and hydrogen; and a fractionation unit for distilling the first olefins stream into one or more purified streams.

22. The olefins recovery plant of claim 21, comprising:

a primary condenser and vapor-liquid separator for partially condensing the raw olefins streams to form a primary condensate stream and a primary vapor stream;

a prestripping column for stripping methane and hydrogen from the primary condensate stream to form a second olefins stream essentially free of methane and hydrogen and a secondary vapor stream;

lines for feeding the primary vapor stream and, optionally, the secondary vapor stream, to the membrane separator; and a line for feeding the second olefins stream to the fractionation unit.

23. The olefins recovery plant of claim 22, wherein the distillation column comprises a depropanizer, and the fractionation unit comprises a deethanizer having a feed zone for receiving the first and second olefin streams, and an ethylene-ethane splitter for fractional distillation of an overheads stream from the deethanizer.

24. A method for revamping an olefin plant including a hydrocarbon cracking furnace, a series of first and successive olefins recovery condensers, and vapor-liquid separators, and a demethanizer, comprising the step of:

installing a membrane hydrogen separation apparatus downstream from the first condenser to receive vapor from the first vapor-liquid separator and reject hydrogen therefrom upstream from one or more of the successive condensers and separators 25. The method of claim 24, including the step of installing a heater to heat the vapor feed to the membrane apparatus.

26. The method of claim 25, including the step of installing a line to reinject liquid from the first vapor-liquid separator into a hydrogen-lean vapor stream from the membrane separator.

27. The method of claim 26, including the step of installing an intercondenser on the demethanizer adjacent a lowermost point.

28. In a method for recovering olefins from a cracking furnace effluent stream containing olefins including the steps of condensing and recovering olefins from the furnace effluent stream through a series of chilling and vapor-liquid separation steps, including partially condensing olefins and heavier components from the furnace effluent stream in a primary chiller and recovering condensed olefins and a lean vapor stream from a primary vapor-liquid separator and condensing and recovering olefins from the lean vapor stream through a series of secondary chilling and vapor-liquid separation steps, and distilling the recovered olefins in a demethanizer, the improvement comprising the step of:

selectively rejecting hydrogen from the lean vapor stream using a membrane separator.

* * * * *